(12) United States Patent
Gust et al.

(10) Patent No.: US 7,143,704 B1
(45) Date of Patent: Dec. 5, 2006

(54) RECESSED DISC OPENER AND MOUNTING ASSEMBLY METHOD AND APPARATUS

(75) Inventors: Jake N. Gust, Fargo, ND (US); Michael Smette, Fargo, ND (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/233,689

(22) Filed: Sep. 23, 2005

(51) Int. Cl.
  *A01B 49/04* (2006.01)
  *A01C 5/00* (2006.01)
  *A01C 13/00* (2006.01)
(52) U.S. Cl. ..................... 111/137; 111/167
(58) Field of Classification Search .............. 111/62, 111/134–137, 167–169, 190–194
See application file for complete search history.

(56) References Cited

U.S. PATENT DOCUMENTS

| 358,246 | A | | 2/1887 | Arnett |
| 1,663,239 | A | | 3/1928 | Buckman |
| 3,847,042 | A | * | 11/1974 | Wilson .................... 81/175 |
| 4,590,869 | A | | 5/1986 | Steilen |
| 4,723,495 | A | | 2/1988 | Dietrich, Sr. et al. |
| 5,620,055 | A | | 4/1997 | Javerlhac |
| 6,367,561 | B1 | | 4/2002 | Firdaus |
| 6,378,222 | B1 | | 4/2002 | Enzinna |
| 6,386,127 | B1 | | 5/2002 | Prairie et al. |
| 2004/0067120 | A1 | * | 4/2004 | Speer ..................... 411/14 |

* cited by examiner

*Primary Examiner*—Christopher J. Novosad
(74) *Attorney, Agent, or Firm*—Rebecca Henkel

(57) ABSTRACT

A disc opener assembly and method, the assembly mounted to a tool support member connected to a work vehicle for opening a seed trench in the ground upon which the vehicle moves, the opener assembly including a disc member and at least some type of fastening member where the disc member includes a substantially flat circumferential portion, an intermediate portion and a recessed portion that forms a recess wherein, when the fastening member is used to secure the disc member to the support member, no part of the fastening member extends from the recess and the portion of the fastening member within the recess is accessible adjacent the intermediate member to facilitate fastening and unfastening.

20 Claims, 4 Drawing Sheets

RECESSED DISC OPENER AND MOUNTING ASSEMBLY METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to agricultural planting equipment and more particularly to a disc opener assembly for a seed planter.

The efficient production of crops requires that seed be planted in various and selective manners that depend upon the type of seed, the soil conditions and the location. The seed planter must be capable of opening a seed trench at a selected depth, accurately spacing the seeds apart in the seed trench, covering the seed with an appropriate amount of soil and assuring that the seed is in proper contact with the soil.

To open seed trenches, a typical seed planter includes a plurality of disc openers mounted to an elongated frame. Each disc, as the label implies, includes an essentially flat round or circular member. In at least some cases, discs are mounted to axles which are in turn mounted to the frame for rotation about disc axis. Screws are typically used to mount the discs to the axles.

Existing seed planters utilize various adjustment mechanisms to control the depth of the seed trench. An exemplary adjustment mechanism includes gauge wheels, one wheel mounted adjacent each disc. Here, in at least some cases, in addition to setting disc depth, a gauge wheel may also help maintain an associated disc clean by forcing debris therefrom as the disc and wheel rotate. To accurately set disc depth and to effectively clean an associated disc, a gauge wheel should be mounted as close as possible to an adjacent disc surface.

Often at least a portion of a gauge wheel will be located immediately adjacent the screw heads that mount an associated disc to an axle. To enable gauge wheels to be as close as possible to the disc surfaces, the heads of the screws that mount the discs to the axles can be countersunk so that surfaces thereof are flush with the surfaces of the discs that face the wheels. Over time the opening discs wear appreciably and eventually have to be replaced or sharpened. The discs can be removed by using a screwdriver to unscrew the screws that secure the discs to the axles.

Unfortunately, often the force required to unscrew a disc is relatively large. As generally known, the torque that can be applied using a screwdriver is limited. In addition, as well known, if a screwdriver head is not properly seated within a head receiving recess, the head can slip out of the recess during a loosening motion and the screw head can be stripped or at least partially stripped which further reduces the torque that can be applied to the screw during a next attempt to loosen, In many cases it has been observed that, because of the proximity of the screw heads to field debris and soil, the head receiving recesses in the screws become caked with matter which, if not removed, blocks proper screwdriver head seating.

Thus, it would be advantageous to have a disc-gauge wheel assembly where the components that secure a disc to an axle are easy to manipulate and where the components allow positioning of the gauge wheel immediately adjacent a surface of the disc.

BRIEF SUMMARY OF THE INVENTION

One embodiment of the presenting invention includes a disc opener assembly mounted to a tool support member connected to a work vehicle for opening a seed trench in the ground upon which the vehicle moves, the opener assembly comprising a disc member including a circumferential portion and a central portion, the circumferential portion including a flat doughnut shaped circumferential wall member having first and second oppositely facing and substantially parallel surfaces, the central portion including a recessed wall member and an intermediate linking member, the recessed wall member forming first and second oppositely facing and substantially parallel surfaces where the first surface of the recessed wall member faces in the same direction as the first surface of the circumferential wall member, the recessed wall member recessed so that the first surface of the recessed wall member is offset from the first surface of the circumferential wall member to form a recess, the intermediate linking member linking the recessed wall member to the circumferential wall member, the recessed wall member forming at least a first through hole and at least a first fastening member including a base member and an extending member, the extending member extending from the base member through the through hole and secured at a distal end to the support member, the base member restraining the recessed wall member to hold the disc member to the support member with the base member completely within the recess, wherein, the base member and the recessed wall member are dimensioned such that a gap is formed between the base member and the intermediate linking member when the base member restrains the recessed wall member.

In at least some cases the first fastening member includes a bolt and wherein the base member and the extending member are a bolt head and a threaded shaft, respectively, the head including a circumferential surface and oppositely facing first and second end surfaces, the shaft extending from the second end surface and received at least partially by the support member to secure the disc member to the supporting assembly with the head member located completely within the recess. In some cases the gap is at least one sixteenth of an inch. In some cases the gap is at least one half an inch.

Some embodiments further including second, third and fourth bolts, each of the bolts includes a head member and a shaft, the shafts of the second, third and fourth bolts passing through the second, third and fourth through holes and at least partially received by the supporting assembly to mount the disc opener assembly to the support member, respectively, with the head members of the second, third and fourth bolts completely within the recess and, wherein, a gap exists between the circumferential surface of each of the head members of the second, third and fourth bolts and the intermediate linking member and a gap also exists between each of the first, second, third and fourth head members. In some cases the gaps are at least one sixteenth of an inch. In some embodiments each of the gaps are at least one half an inch.

In at least some embodiments the bolt is secured to the supporting assembly via a nut. In some cases the circumferential surface of the bolt head is hexagonal.

In some cases the intermediate linking member is an intermediate wall member. In some embodiments intermediate wall member is frusto-conical in shape. In some cases the intermediate wall member diverges at an angle from the conical wall member toward the recessed wall member at an angle of between 20 degrees and 75 degrees. In some cases the intermediate wall member diverges at an angle from the conical wall member toward the recessed wall member at an angle of substantially 45 degrees.

Some embodiments further include a gauge wheel supported adjacent and substantially flat up against at least a portion of the first surface of the circumferential wall member. In some cases the second surface of the recessed wall member is adjacent the support member.

Some embodiments include a disc opener assembly mounted to a tool support member connected to a work vehicle for opening a seed trench in the ground upon which the vehicle moves, the opener assembly comprising a disc member including a circumferential portion and a central portion, the circumferential portion including a flat doughnut shaped circumferential wall member having first and second oppositely facing and substantially parallel surfaces, the central portion including a recessed wall member and an intermediate frusto-conical linking wall member, the recessed wall member forming first and second oppositely facing and substantially parallel surfaces where the first surface of the recessed wall member faces in the same direction as the first surface of the circumferential wall member, the recessed wall member recessed so that the first surface of the recessed wall member is offset from the first surface of the circumferential wall member to form a recess, the intermediate linking wall member linking the recessed wall member to the circumferential wall member, the recessed wall member forming at least first and second through holes and at least first and second bolts, each of the bolts including a bolt head and a threaded shaft, each head including a circumferential surface and oppositely facing first and second end surfaces, the first and second shafts extending from the second end surfaces of the first and second bolt heads, through the first and second through holes and at least partially received by the supporting assembly, respectively, to secure the disc member to the supporting assembly with the head members located completely within the recess and with the second surface of the recessed wall member adjacent the support member wherein, the heads and the recessed wall member are dimensioned such that gaps of at least ¼th of an inch are formed between the heads and the intermediate wall member and between the first and second heads when the bolts secure the disc member to the supporting assembly.

In some cases the recessed wall member forms third and fourth through holes, the assembly further including third and fourth bolts that include heads and shafts where the third and fourth shafts extend through the third and fourth through holes with distal ends secured to the support member. Some cases further include a gauge wheel supported adjacent and substantially flat up against at least a portion of the first surface of the circumferential wall member.

Some embodiments include a method for opening a seed trench in the ground upon which a vehicle moves where a support member is supported by the vehicle, the method comprising the steps of providing a disc member that includes a circumferential portion and a central portion, the circumferential portion including a flat doughnut shaped circumferential wall member having first and second oppositely facing and substantially parallel surfaces, the central portion including a recessed wall member and an intermediate linking member, the recessed wall member forming first and second oppositely facing and substantially parallel surfaces where the first surface of the recessed wall member faces in the same direction as the first surface of the circumferential wall member, the recessed wall member recessed so that the first surface of the recessed wall member is offset from the first surface of the circumferential wall member to form a recess, the intermediate linking member linking the recessed wall member to the circumferential wall member, the recessed wall member forming at least a first through hole, mounting the disc member to the support member using at least a first bolt that includes a bolt head and a threaded shaft, the head including a circumferential surface and oppositely facing first and second end surfaces, the shaft extending from the second end surface of the bolt head, through the through hole and at least partially received by the supporting assembly to secure the disc member to the supporting assembly with the head member located completely within the recess, wherein, the head and the recessed wall member are dimensioned such that gaps of at least ¼th of an inch are formed between the head and the intermediate wall member.

In some cases the step of providing a disc member includes providing a disc member where the recessed wall member forms a plurality of through holes and wherein the step of mounting includes using a plurality of bolts to mount the disc member to the support member wherein the bolt heads are each completely within the recess and wherein gaps exist between each of the circumferential surfaces of the bolt heads and the intermediate wall member and between adjacent bolt heads.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
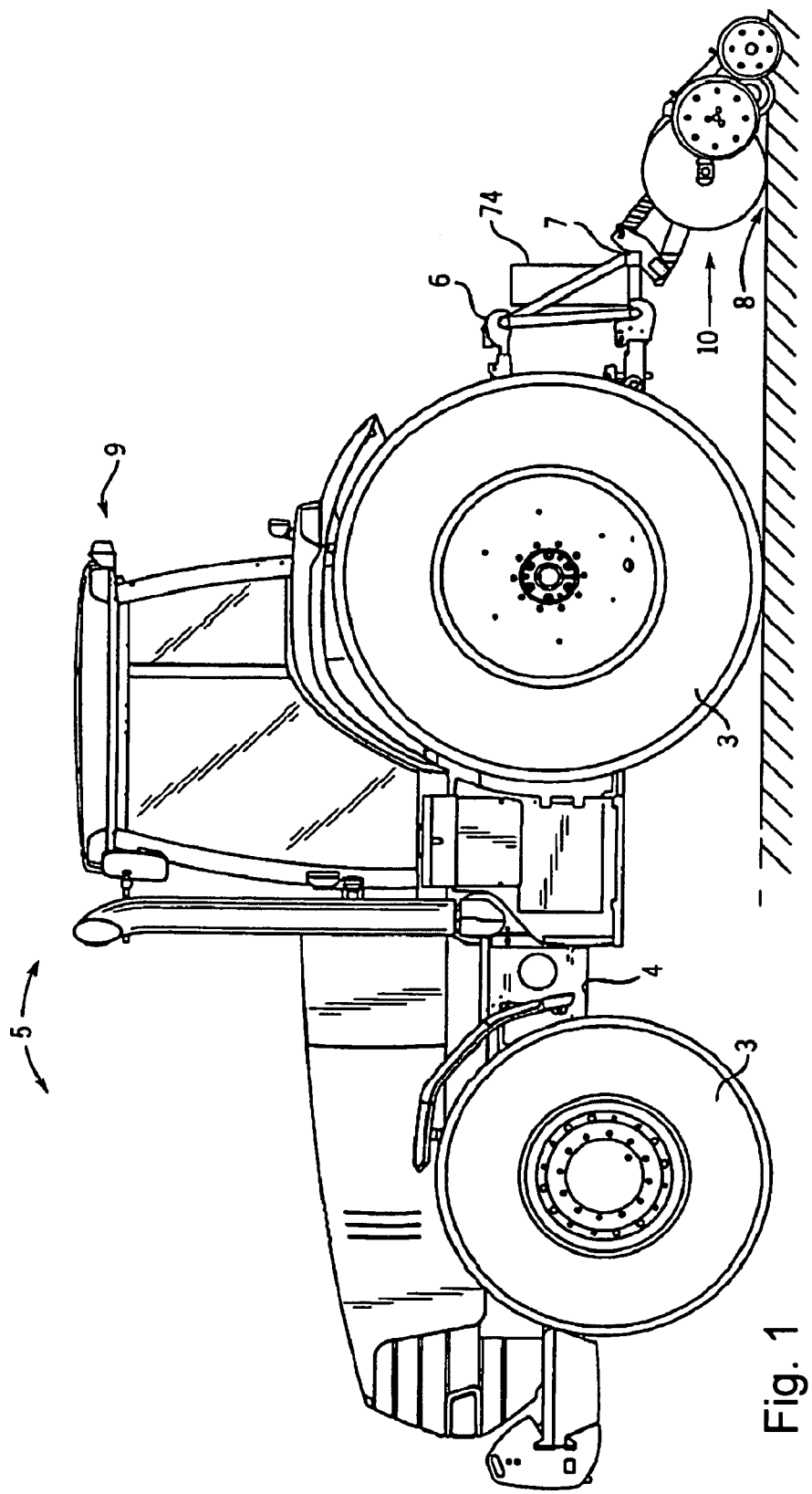
FIG. 1 is a side elevational view of a disc opener assembly mounted on a tool bar coupled to a work vehicle.

Referring now to the drawings wherein like reference numerals correspond to similar elements throughout the several view and, more specifically, referring to FIG. 1, the present invention will be described in the context of an exemplary work vehicle 5 having a vehicle support structure 4 to which a plurality of wheels 3 are rotatably mounted. Although a four wheel work vehicle is illustrated, it should be understood that a 6 or 8 wheel vehicle is contemplated as well as a tracked vehicle, with the tracks being supported by wheels. A work vehicle 5 typically has a power source coupled to a transmission with the transmission operatively coupled to at least two of the wheels 3. The power source can be an internal combustion engine such as a gasoline engine or a diesel engine and it may also be an electric motor or a steam driven turbine. The present disc opener assembly for a seed planter is for a single disc opener arrangement.

Figure 2:
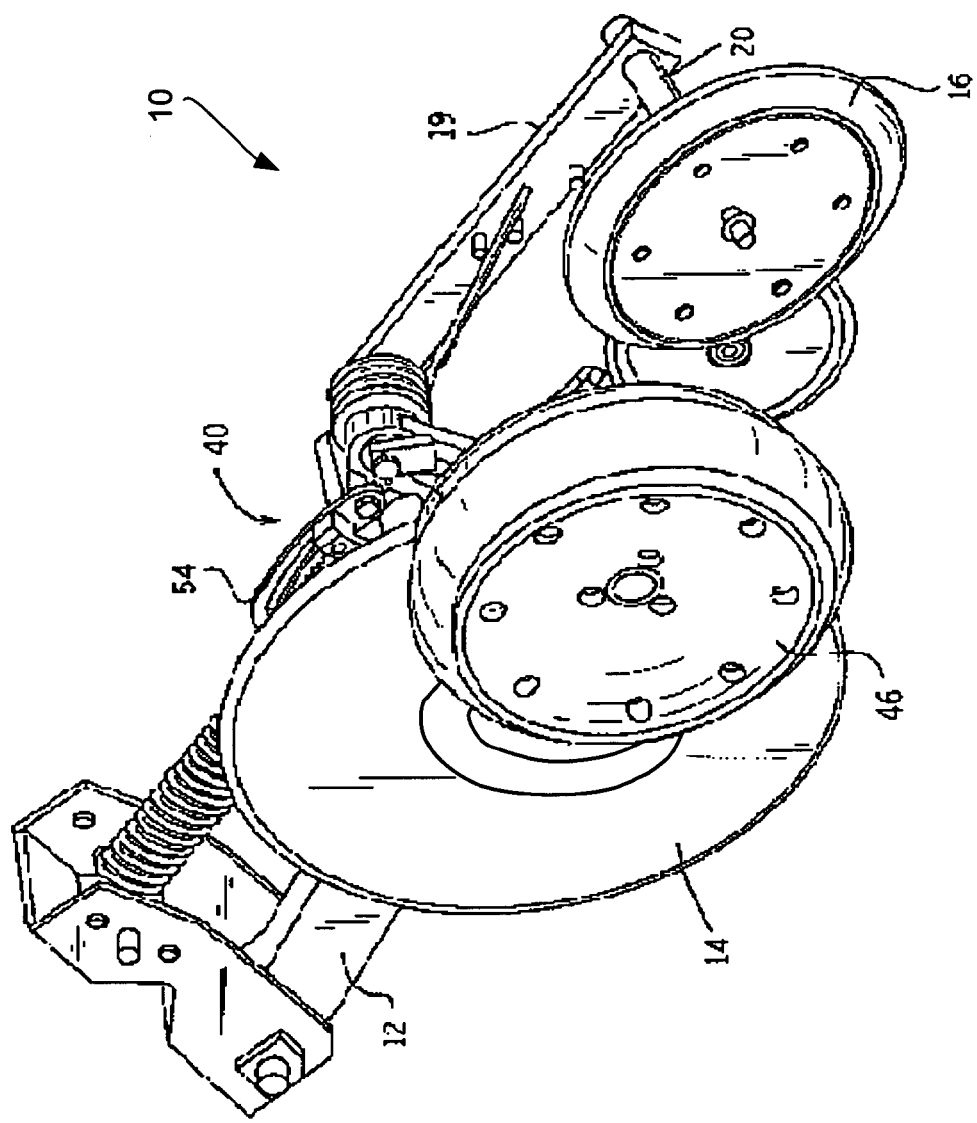
FIG. 2 is a perspective view from the rear of one of the disc opener assemblies shown in FIG. 1.
Figure 5:
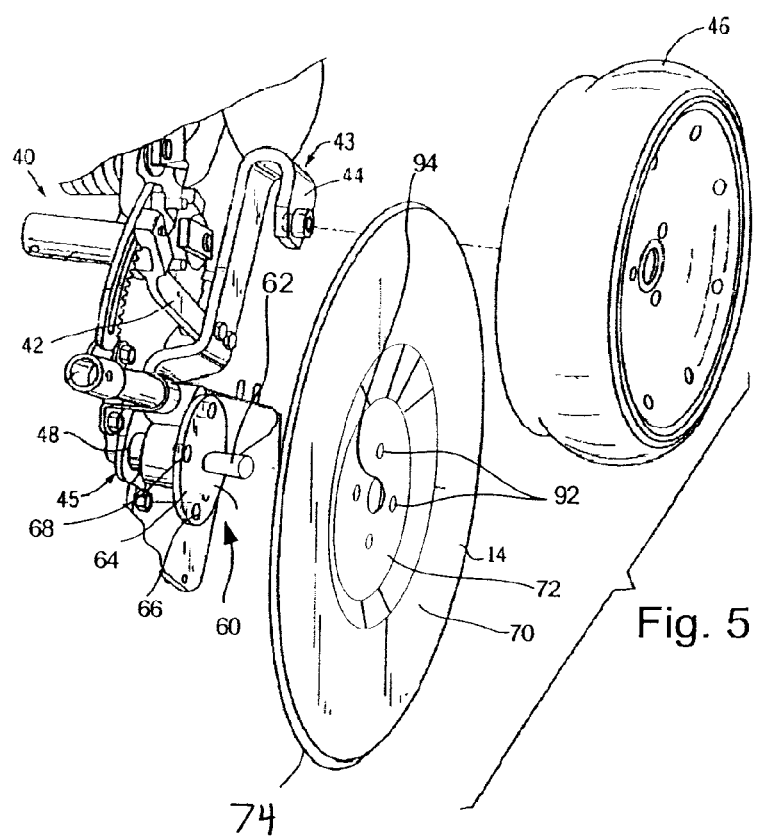
FIG. 5 is an exploded view showing the disc member of FIG. 4 and additional detail.

Referring still to FIG. 1 and also to FIGS. 2 and 5, a disc opener assembly 10 is mounted on a tool bar 7 connected to work vehicle 5 for opening a seed trench 8 in the ground upon which vehicle 5 moves. A main arm 12 is attached to tool bar 7 with a disc 14 mounted for rotation on the main arm 12. A depth adjustment mechanism 40 is used to adjust the depth of the disc 14 in the seed trench 8 with a seed placement device (not labeled) positioned in the seed trench 8 for depositing a seed 71 in the seed trench 8. The seed trench 8 is opened by disc 14 as work vehicle 5 moves across the ground.

The disc opener assembly 10 is provided with a disc scraper 30 mounted on a scraper mount 33 attached below the main arm 12 and aligned with the disc 14 to clean the disc. Disc scraper 30 is a planar member with at least one edge 32 which is aligned with the disc 14 and contacts the disc to clean dirt and plant debris from the disc 14 as the disc is rotated. The disc scraper 30 is attached to the scraper mount 33 by fasteners or other convenient and conventional means of mounting. In the illustrated embodiment, two retainers 36 and other components that are not illustrated, bias scraper 30 into a position in which the scraper self-aligns with disc 14.

Disc opener assembly 10 includes a packer wheel 16 rotatably mounted on an axle 18 with the axle 18 slidingly installed in a position tube 20. The position tube 20 is attached to a packer wheel arm 19 connected to main arm 12. As the disc opener assembly 10 moves through the field opening a seed trench 8, the packer wheel 16 closes the seed trench 8. The distance of the packer wheel 16 away from the seed trench 8 determines the amount of soil deposited into the seed trench 8 during the closing operation and the compaction of the soil on the seed 71 in the trench.

Figure 6:
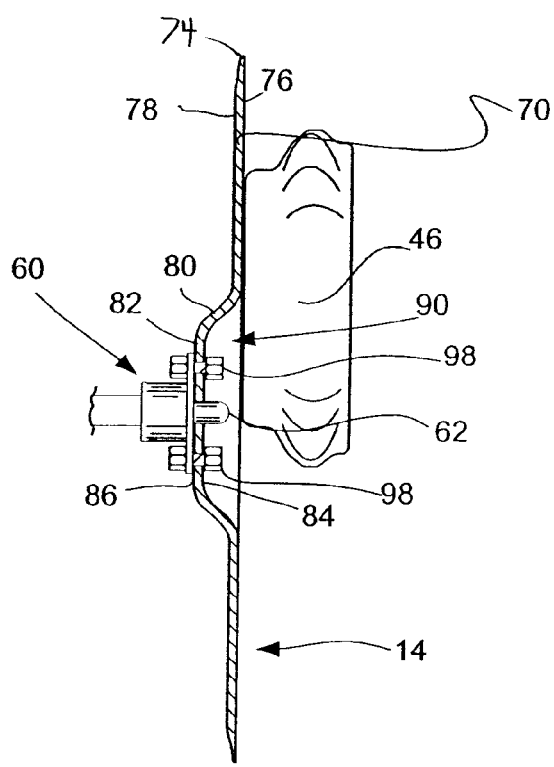
FIG. 6 is a partial cross-sectional view of the disc member and associated components of FIG. 4, albeit where the components are secured together.

Referring to FIGS. 2, 5 and 6, assembly 10 has a depth adjustment mechanism 40. To this end, gauge wheel 46 is mounted for rotation on one end 43 of a gauge wheel arm 44 with an opposite end 45 of the gauge wheel arm 44 being attached to a gauge wheel pivot 48. The gauge wheel 46 can be made from composite elements, such as a tire rim formed from metal or plastic, connected by a suitable fastener and having a semi-pneumatic tire disposed about its periphery. The semi-pneumatic tire helps reduce side-wall compaction of the seed trench 8 while allowing the gauge wheel 46 to move toward and away from the ground as the depth adjustment mechanism 40 is operated, thereby adjusting the depth of the disc 14. Operation of the depth adjustment mechanism is described in greater detail in U.S. Pat. No. 6,386,127 which is titled "Disc Opener Assembly For A Seed Planter" and which is incorporated herein by reference for its teachings regarding depth adjustment.

Referring now to FIGS. 2, 4, 5 and 6, assembly 10 includes a separate axil 60 for each of the disc openers supported thereby. Hereinafter, axil 60 is also referred to as support member generally. As best illustrated in FIG. 5, axil 60 includes, among other components, a base plate member 64 and an alignment extension member 62. Plate member 64 is a circular flat and rigid member that includes a bearing surface 66 that forms four through holes, two of which are collectively identified by numeral 68 in FIG. 5, that are equispaced around the circumference of plate member 64 (only three through holes 68 illustrated in FIG. 5). Extension member 62 extends perpendicular to bearing surface 66 and is centered between through holes 68.

Figure 3:
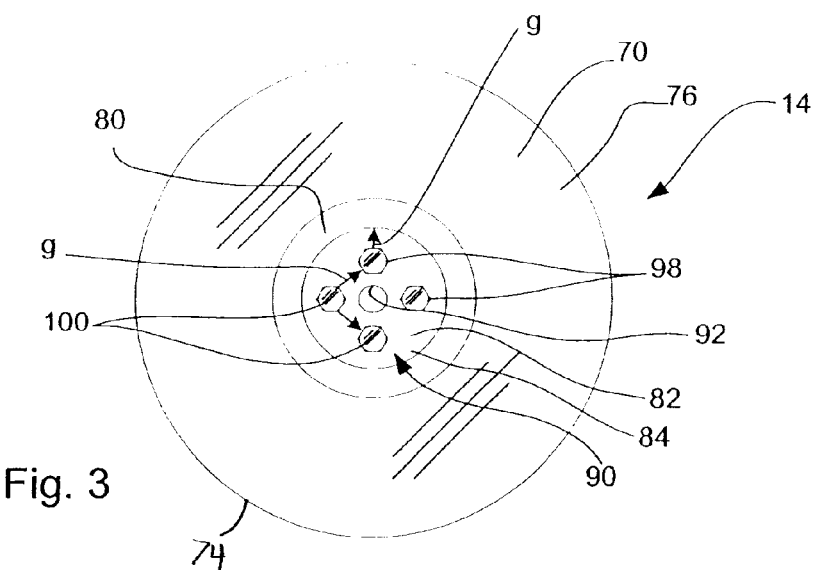
FIG. 3 is a front plan view of the disc member of FIG. 2.

Referring to FIGS. 3 though 6, exemplary disc member 14 includes a circumferential portion 70 and a central portion 72. Circumferential portion 70 is a donut shaped substantially flat member that has a circular circumferential edge 74 and that forms first and second oppositely facing and generally parallel surfaces 76 and 78, respectively.

Central portion 72 includes an intermediate linking member or wall member 80 and a recessed wall member 82. Recessed wall member 82 is a circular and substantially flat member having first and second oppositely facing surfaces 84 and 86, respectively. First surface 84 of recessed member 82 is offset or recessed from first surface 76 of circumferential member 70 so as to form a central recess 90. Intermediate wall member or linking member 80 links recessed member 82 to circumferential member 70. In at least some embodiments, as illustrated, intermediate wall member 80 is frusto-conical in shape and, to that end, diverges from circumferential member 70 to recessed member 82 forming an angle $\alpha$ with circumferential member 70 of between 20 and 75 degrees, and in at least some embodiments, forming an angle $\alpha$ of approximately 45 degrees.

Figure 4:
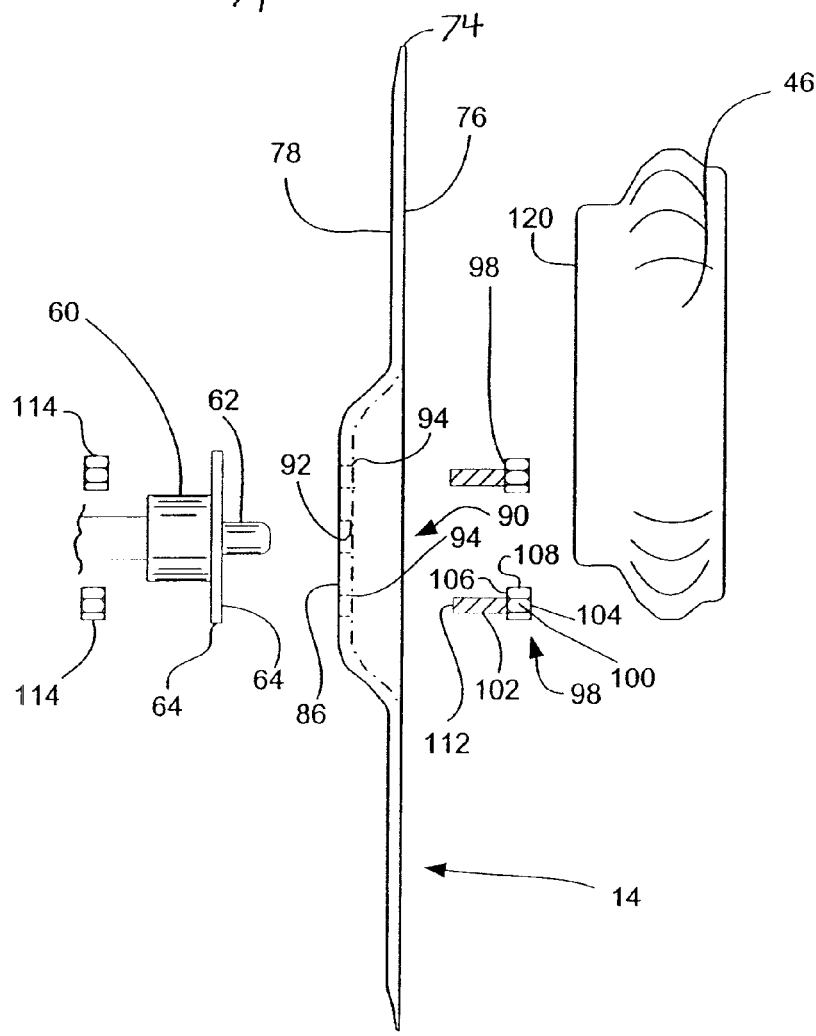
FIG. 4 is an exploded view showing an exemplary disc member and associated components for mounting the disc member according to at least one inventive embodiment.

Referring still to FIGS. 3–5, recessed wall member 82 forms a central opening 92 and four through holes, two of which are collectively identified by numeral 94 in each of FIGS. 4 and 5. As the label implies, central opening 92 is formed at the center of disc member 14. Through holes 94 are equispaced about opening 92 and are arranged so that they align with the openings 68 formed by plate member 64 when extension member 62 is received within opening 92.

Referring again to FIG. 4 and also to FIG. 6, in the illustrated embodiment, four bolts, two of which are collectively identified by numeral 98 in each of FIGS. 4 and 6, are provided for mounting disc member 14 to axil 60. As shown in FIG. 4, an exemplary bolt 98 includes a head member 100 and a threaded shaft 102. Head 100 includes first and second oppositely facing surfaces 104 and 106 and a circumferential surface 108 that traverses the distance between the first and second surfaces 104 and 106. In the illustrated embodiment, circumferential surface 108 is hexagonal (see end view of bolt 98 in FIG. 3). Shaft 102 extends perpendicular to and from second surface 106 to a distal end 112. A separate nut 114 (see FIG. 4) is provided for each of the bolts 98.

As best shown in FIG. 6, the dimensions of the bolt heads 100 are much smaller than the dimensions of recessed wall member 82 such that, when the heads 100 are located within recess 90, gaps g exist between the circumferential surfaces (e.g., 108) of the heads 100 and the intermediate linking wall member 80 and also exist between adjacent heads 100.

To mount disc member 14 to axil 60, extending member 62 is aligned with opening 92 and slid therethrough until second surface 86 of recessed wall member 82 abuts bearing surface 66 of plate member 64, disc member 14 is rotated until through holes 94 are aligned with openings 68 formed by plate member 64. Next, bolt shafts 102 are slid through the aligned through holes 94 and opening 66 and nuts 114 are tightened on to the distal ends 112 of the bolt shafts 102. Here, to tighten the bolts and associated nuts, wrenches or the like can be used to grasp the bolt heads 100 and nuts 114. Importantly, gaps g (see again FIG. 6) enable a person installing disc member 14 to easily grasp the heads 100 and apply relatively large torquing forces thereto. Similarly, to remove a disc member 14, a wrench or other type of tool can be used to grasp the bolt heads 100 using a wrench or the like and can apply large force thereto.

Referring still to FIGS. 4–6, gauge wheel 46 is mounted to gauge wheel arm 44. As shown best in FIG. 6, in at least some embodiments, gauge wheel 46 can be mounted extremely close to front surface 76 of disc member 14. As shown because the heads of bolts 98 are completely located within recess 90, the heads do not obstruct placement or rotation of gauge wheel 46.

One or more specific embodiments of the present invention have been described above. It should be appreciated that in the development of any such actual implementation, as in any engineering or design project, numerous implementation-specific decisions must be made to achieve the developer's specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. To apprise the public of the scope of this invention, the following claims are made:

What is claimed is:

1. A disc opener assembly mounted to a tool support member connected to a work vehicle for opening a seed trench in the ground upon which the vehicle moves, the opener assembly comprising:
    a disc member including a circumferential portion, a central portion and an edge, the circumferential portion including a flat doughnut shaped circumferential wall member having first and second oppositely facing and substantially parallel surfaces, the central portion including a recessed wall member and an intermediate linking member, the recessed wall member forming first and second oppositely facing and substantially parallel surfaces where the first surface of the recessed wall member faces in the same direction as the first surface of the circumferential wall member, the recessed wall member recessed so that the first surface of the recessed wall member is offset from the first surface of the circumferential wall member to form a recess, the intermediate linking member linking the recessed wall member to the circumferential wall member, the recessed wall member forming at least a first through hole;
    a gauge wheel supported adjacent and substantially flat up against at least a portion of the first surface of the circumferential wall member; and
    at least a first fastening member including a base member and an extending member, the extending member extending from the base member through the through hole and secured at a distal end to the support member, the base member restraining the recessed wall member to hold the disc member to the support member with the base member completely within the recess;
    wherein, the base member and the recessed wall member are dimensioned such that a gap is formed between the base member and the intermediate linking member when the base member restrains the recessed wall member;
    wherein, the gauge wheel can be positioned adjacent and substantially flat up against at least a portion of the edge.

2. The assembly of claim 1 wherein the first fastening member includes a bolt and wherein the base member and the extending member are a bolt head and a threaded shaft, respectively, the head including a circumferential surface and oppositely facing first and second end surfaces, the shaft extending from the second end surface and received at least partially by the support member to secure the disc member to the support member with the head member located completely within the recess.

3. The assembly of claim 2 wherein the gap is at least one sixteenth of an inch.

4. The assembly of claim 3 wherein the gap is at least one half an inch.

5. The assembly of claim 2 further including second, third and fourth bolts, each of the bolts includes a head member and a shaft, wherein the recessed wall member forms second third and fourth through holes, the shafts of the second, third and fourth bolts passing through the second, third and fourth through holes and at least partially received by the support member to mount the disc member to the support member, respectively, with the head members of the second, third and fourth bolts completely within the recess and, wherein, a gap exists between the circumferential surface of each of the head members of the second, third and fourth bolts and the intermediate linking member and a gap also exists between each of the first, second, third and fourth head members.

6. The assembly of claim 5 wherein each of the gaps are at least one sixteenth of an inch.

7. The assembly of claim 5 wherein each of the gaps are at least one half an inch.

8. The assembly of claim 2 wherein the bolt is secured to the support member via a nut.

9. The assembly of claim 2 wherein the circumferential surface of the bolt head is hexagonal.

10. The assembly of claim 2 wherein the intermediate linking member is an intermediate wall member.

11. The assembly of claim 10 wherein the intermediate wall member is frusto-conical in shape.

12. The assembly of claim 10 wherein the intermediate wall member diverges at an angle from the circumferential wall member toward the recessed wall member at an angle of between 20 degrees and 75 degrees.

13. The assembly of claim 12 wherein the intermediate wall member diverges at an angle from the circumferential wall member toward the recessed wall member at an angle of substantially 45 degrees.

14. The assembly of claim 1 wherein the first surface of the circumferential wall member defines a plane that is to a side of the disc member, the plane having a first side and a second side, wherein the gauge wheel can be positioned at any position along the first side of the plane and the base member is positioned between the recessed wall member and the second side of the plane.

15. The assembly of claim 1 wherein the second surface of the recessed wall member is adjacent the support member.

16. A disc opener assembly mounted to a tool support member connected to a work vehicle for opening a seed trench in the ground upon which the vehicle moves, the opener assembly comprising:
    a disc member including a circumferential portion, a central portion and an edge, the circumferential portion including a flat doughnut shaped circumferential wall member having first and second oppositely facing and substantially parallel surfaces, the central portion including a recessed wall member and an intermediate frusto-conical linking wall member, the recessed wall member forming first and second oppositely facing and substantially parallel surfaces where the first surface of the recessed wall member faces in the same direction as the first surface of the circumferential wall member, the recessed wall member recessed so that the first surface of the recessed wall member is offset from the first surface of the circumferential wall member to form a recess, the intermediate linking wall member linking the recessed wall member to the circumferential wall member, the recessed wall member forming at least first and second through holes;

a gauge wheel that can be supported adjacent and substantially flat up against at least a portion of the first surface of the circumferential wall member; and at least first and second bolts, each of the bolts including a bolt head and a threaded shaft, each head including a circumferential surface and oppositely facing first and second end surfaces, the first and second shafts extending from the second end surfaces of the first and second bolt heads, through the first and second through holes and at least partially received by the support member, respectively, to secure the disc member to the support member with the head members located completely within the recess and with the second surface of the recessed wall member adjacent the support member;

wherein, the heads and the recessed wall member are dimensioned such that gaps of at least $\frac{1}{4}^{th}$ of an inch are formed between the heads and the intermediate wall member and between the first and second heads when the bolts secure the disc member to the support member;

wherein, the gauge wheel can be positioned adjacent and substantially flat up against at least a portion of the edge.

17. The assembly of claim 16 wherein the recessed wall member forms third and fourth through holes, the assembly further including third and fourth bolts that include heads and shafts where the third and fourth shafts extend through the third and fourth through holes with distal ends secured to the support member.

18. The assembly of claim 17 wherein, the first surface of the circumferential wall member defines a plane that is to a side of the disc member, the plane having a first side and a second side, wherein the gauge wheel can be positioned at any position along the first side of the plane and the bolt heads are positioned between the recessed wall member and the second side of the plane.

19. A method for opening a seed trench in the ground upon which a vehicle moves where a support member is supported by the vehicle, the method comprising the steps of:

providing a disc member that includes a circumferential portion, a central portion and an edge, the circumferential portion including a flat doughnut shaped circumferential wall member having first and second oppositely facing and substantially parallel surfaces, the central portion including a recessed wall member and an intermediate linking member, the recessed wall member forming first and second oppositely facing and substantially parallel surfaces where the first surface of the recessed wall member faces in the same direction as the first surface of the circumferential wall member, the recessed wall member recessed so that the first surface of the recessed wall member is offset from the first surface of the circumferential wall member to form a recess, the intermediate linking member linking the recessed wall member to the circumferential wall member, the recessed wall member forming at least a first through hole;

providing a gauge wheel supported adjacent and substantially flat up against at least a portion of the first surface of the circumferential wall member;

mounting the disc member to the support member using at least a first bolt that includes a bolt head and a threaded shaft, the head including a circumferential surface and oppositely facing first and second end surfaces, the shaft extending from the second end surface of the bolt head, through the through hole and at least partially received by the support member to secure the disc member to the support member with the head member located completely within the recess;

wherein, the head and the recessed wall member are dimensioned such that gaps of at least $\frac{1}{4}^{th}$ of an inch are formed between the head and the intermediated linking member;

wherein, the gauge wheel can be positioned adjacent and substantially flat up against at least a portion of the edge.

20. The method of claim 19 wherein the step of providing a disc member includes providing a disc member where the recessed wall member forms a plurality of through holes and wherein the step of mounting includes using a plurality of bolts to mount the disc member to the support member wherein the bolt heads are each completely within the recess and wherein gaps exist between each of the circumferential surfaces of the bolt heads and the intermediate liking member and between adjacent bolt heads.

* * * * *